United States Patent [19]

Ueda et al.

[11] Patent Number: 4,970,374

[45] Date of Patent: Nov. 13, 1990

[54] AUTOMATIC HEATING APPLIANCE WITH WEIGHT SENSOR

[75] Inventors: Shigeki Ueda, Yamatokoriyama; Makoto Mihara; Masanobu Inoue, both of Nara; Kenzo Ohji, Ikoma, all of Japan

[73] Assignee: Matsushita Electric Industrial Co., Ltd., Kadoma, Japan

[21] Appl. No.: 388,389

[22] Filed: Aug. 2, 1989

[30] Foreign Application Priority Data

Sep. 2, 1988 [JP] Japan ................................ 63-220962
Sep. 2, 1988 [JP] Japan ................................ 63-220963

[51] Int. Cl.$^5$ ............................ H05B 6/68; G01G 3/14

[52] U.S. Cl. ............................ 219/518; 219/10.55 B; 219/10.55 E; 99/325; 177/210 C

[58] Field of Search .................. 219/10.55 B, 10.55 E, 219/10.55 R, 10.55 M, 518; 99/325; 177/210 C

[56] References Cited

U.S. PATENT DOCUMENTS

| | | | |
|---|---|---|---|
| 3,634,096 | 1/1972 | Ferrarini | 99/325 |
| 4,366,875 | 1/1983 | Daugh et al. | 177/210 C |
| 4,441,002 | 4/1984 | Teich et al. | 219/10.55 B |
| 4,461,363 | 7/1984 | Loy | 177/210 C |
| 4,521,658 | 6/1985 | Wyland et al. | 219/10.55 B |
| 4,572,006 | 2/1986 | Wolfendale | 177/210 C |
| 4,591,684 | 5/1986 | Tanabe et al. | 219/10.55 B |
| 4,595,827 | 6/1986 | Hirai et al. | 219/518 |
| 4,599,503 | 7/1986 | Ueda | 219/10.55 B |
| 4,649,759 | 3/1987 | Lee | 177/210 C |
| 4,672,181 | 6/1987 | Saramoto et al. | 219/518 |
| 4,676,328 | 6/1987 | Morino | 177/210 C |

FOREIGN PATENT DOCUMENTS 0209201 1/1987 European Pat. Off. .
2173902 10/1986 United Kingdom .

*Primary Examiner*—Philip H. Leung
*Attorney, Agent, or Firm*—Cushman, Darby & Cushman

[57] ABSTRACT

There is disclosed herein an automatic heating appliance for controlling heating of an object in response to operation of instruction keys and on the basis of the weight of an object to be heated. The appliance includes therein a heating chamber for housing the object, a heater provided on or in the heating chamber for heating the object placed therein, and a turntable provided in the heating chamber for keeping thereon the object during heating. Also included in the appliance are a weight detector for obtaining first weight data in response to the object being placed on the turntable and a temperature compensator for obtaining a second weight data in response to the object being placed thereon, the temperature compensator substantially having the same temperature characteristic as the weight detector. A control unit of the appliance is responsive to the first and second weight data in order to remove an error component due to variation of the characteristic of the weight detector by variation of temperature in accordance with the result of comparison between the first and second weight data so as to determine a weight resulting from only the object. The control unit controls the heating of the object in accordance with variation of the determined object weight.

4 Claims, 10 Drawing Sheets

AUTOMATIC HEATING APPLIANCE WITH WEIGHT SENSOR

BACKGROUND OF THE INVENTION

The present invention relates generally to automatic heating appliances, and more particularly to an appliance for automatically controlling heating to a cooking object on the basis of variation of the weight of the object to be heated.

Known are heating appliances with a plurality of different sensors which automatically controlling the time period of heating of an object in accordance with signals from the plurality of sensors such as humidity sensor, gas sensor and weight sensor. Using the plurality of sensors allows automatization of a wide range of cooking category. For example, the humidity sensor and gas sensor detect gases and vapors generated from the cooked object such as food and the results of the detection is used for controlling the termination of the heating of the cooked object. However, in the case of thawing of an object of a below-zero temperature, i.e., frozen food, the gases and vapors developed from the frozen foods are extremely few and generally the gas sensor and humidity sensor do not have sensitivities sufficient to detect them. Thus, a weight sensor is employed for the control of the termination of the heating, because the thawing time can be calculated by detection of the quantity of the frozen food. That is, the relative permittivity of ice is constant and the heating time period depends on only the quantity of the frozen food regardless of kinds of cooked objects. Accordingly, various sensors should be required for desirable automatization of cooking. However, provision of a plurality of sensors results in the appliance with a complex arrangement and a complex control system, thereby causing increase in the manufacturing cost.

On the other hand, various types of automatic heating appliances with only a weight sensor have been proposed heretofore. One known technique is that as disclosed in Japanese Patent Provisional Publication No. 62-66025 the termination of the heating is controlled by detecting the decrease in the weight of the heated food and then determining the kind of the food on the basis of the variation of the weight with respect to time during heating. There is a problem which arises with this type of appliance, however, in that the detection accuracy depends on the stability of the temperature characteristics of the weight sensor and the detection circuit therefor. One possible solution is to eliminate variation (drift) of the temperature characteristic of the weight-detecting devices, as disclosed in Japanese Patent Provisional Publication No. 62-168364, the technique of which involves detecting the atmosphere temperature of the weight-detecting devices and detecting weight of the food under the condition that the atmosphere temperatures at two timings are equal to each other so as to remove the detection error due to the variation of the temperature characteristic. However, this type of automatic heating appliance also provides problems that the use is limted to the oven cooking and a temperature detecting means should be required to detect the atmosphere temperature of the weight-detecting devices to result in a complex control system.

SUMMARY OF THE INVENTION

It is therefore an object of the present invention to provide an automatic heating appliance with a single weight sensor which is capable of satisfying the ordinary heating and thawing requirements.

In accordance with the present invention, there is provided an automatic heating appliance having therein a heating chamber for housing an object to be heated, comprising: heating means provided on or in said heating chamber for heating said object placed in said heating chamber in accordance with a heating control signal; table means provided in said heating chamber for keeping thereon said object during heating; instruction key means including a thawing instruction key for giving instructions to thaw said object of a below-zero temperature and a heating instruction key for giving instructions to heat said object up to a predetermined temperature; weight detection means for detecting the weight of said object placed on said table means; and control means coupled to said instruction key means for controlling heating of said object by outputting said heating control signal to said heating means in response to operation of said instruction key means and further coupled to said weight detection means so as to control the heating of said object on the basis of the detected weight of said object, said control means, in response to operation of said thawing instruction key, calculating a heating time of said object as a function of the weight of said object before or immediately after a start of the heating, and, in response to operation of said heating instruction key, calculating a heating time of said object on the basis of variation of the weight of said object successively detected at a predetermined time interval.

Preferably, said weight detection means is composed of an electric capacitance type pressure sensor which includes a pair of flat plate type detection electrodes facing each other to be spaced by a predetermined distance from each other and a pair of flat plate type reference electrodes facing each other to be spaced by a predetermined distance from each other and respectively provided around said pair of detection electrodes. Said control means is responsive to the electric capacitance due to the detection electrodes and the electrical capacitance due to the reference electrodes to calculate the weight of said object on the basis of both the sensed capacitances.

In accordance with the present invention, there is further provided an automatic heating appliance having therein a heating chamber for housing an object to be heated, comprising: heating means provided on or in said heating chamber for heating said object placed in said heating chamber; table means provided in said heating chamber for keeping thereon said object during heating; weight detection means for obtaining first weight data in response to said object being placed on said table means; temperature compensation means for obtaining a second weight data in response to said object being placed on said table means, said temperature compensation means substantially having the same temperature characteristic as said weight detection means; and control means coupled to said weight detection means and said temperature compensation means so as to remove an error component due to variation of the characteristic of said weight detection means by variation of temperature in accordance with the result of comparison between said first weight data obtained by said weight detection means and said second weight data obtained by said temperature compensation means so as to determine a weight of only said object, said control means controlling the heating of said object in accordance with variation of the determined object weight.

Preferably, said weight detection means is composed of an electric capacitance type pressure sensor which includes a pair of flat plate type detection electrodes facing each other to be spaced by a predetermined distance from each other, and said temperature compensation means is composed of an electric capacitance type pressure sensor which includes a pair of flat plate type reference electrodes facing each other to be spaced by a predetermined distance from each other, said temperature compensation means being disposed near said weight detection means. Similarly, said control means is responsive to the electric capacitance due to the detection electrode and the electric capacitance due to the reference electrode to calculate the weight of said object on the basis of both the sensed capacitances.

BRIEF DESCRIPTION OF THE DRAWINGS

The object and features of the present invention will become more readily apparent from the following detailed description taken in conjunction with the accompanying drawings in which.

DETAILED DESCRIPTION OF THE INVENTION

Figure 1:
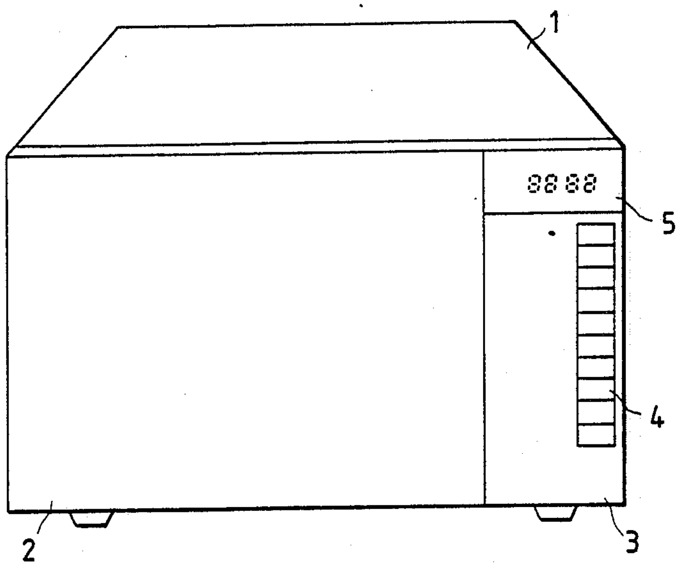
FIG. 1 is a perspective view showing the outward appearance of an automatic heating appliance according to an embodiment of the present invention.

Referring now to FIG. 1, there is illustrated an automatic heating appliance such as a microwave oven according to an embodiment of the present invention. In FIG. 1, the automatic heating appliance of this embodiment has a housing 1 equipped with an openable and closable door 2 at its front face, the housing 1 being further provided with an operating panel 3 in the vicinity of the door 2. On the operating panel 3 are disposed a keyboard 4 and an indication section 5, the keyboard 4 having various instruction keys such as a thrawing key for giving an instruction of automatically thrawing a frozen object and a heating key for providing an instruction of automatically heating an object to be heated up to a predetermined temperature.

Figure 2:
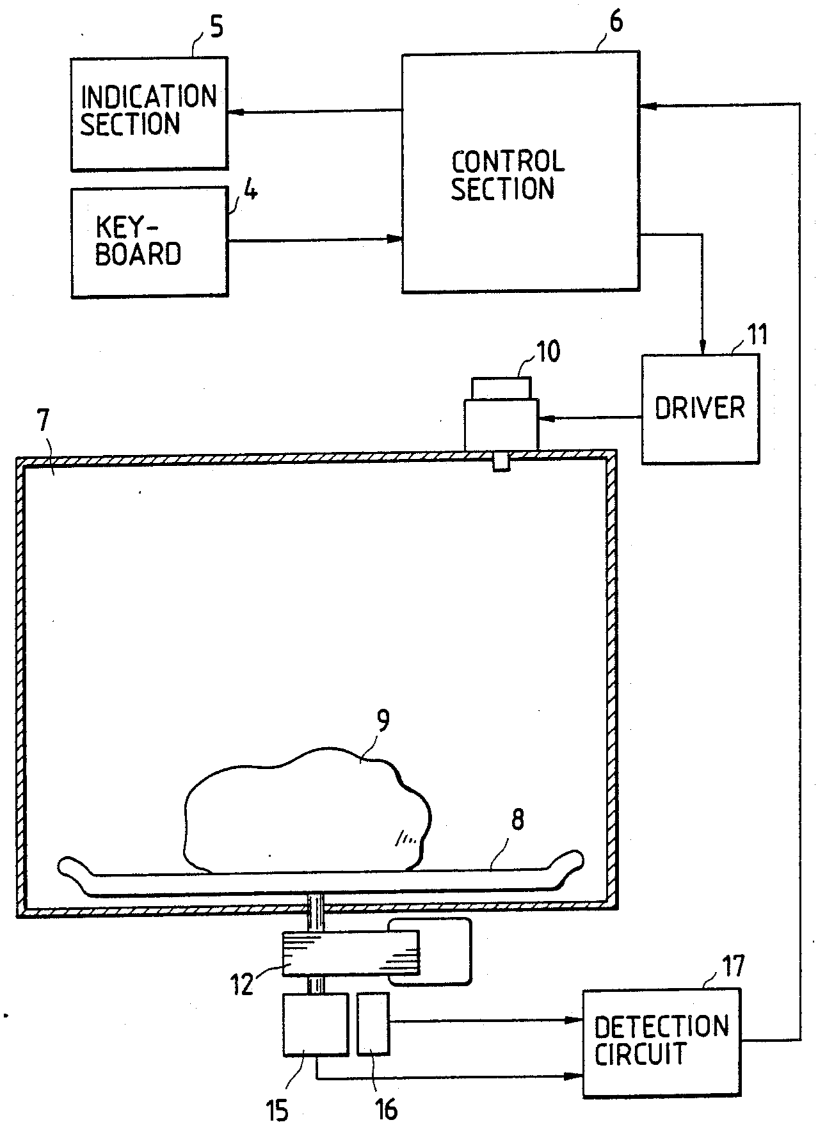
FIG. 2 is a block diagram showing a heating system of the automatic heating appliance of the embodiment.

FIG. 2 is a block diagram showing a system arrangement of the automatic heating appliance of this embodiment. Illustrated at numeral 6 is a control section which is responsive to various instructions inputted through the various operating keys of the keyboard 4 and gives indications corresponding to the instruction on the indication section 5. The appliance has therein a heating chamber 7 where a rotatable turntable 8 is disposed to place thereon an object 9 such as a food to be heated or cooked. On the ceiling of the heating chamber 7 is provided a heating means 10 such as a magnetron which is operable in response to an electric power supply from a driver 11 under control of the control section 6. The turntable 8 has a rotating shaft which is coupled to a drive shaft of a drive source 12, disposed at the outside of the heating chamber 7, to as to be rotatable during heating by the magnetron 10 to prevent uneven heating of the object 9 to be heated. The drive shaft of drive source 12 is arranged to be movable in the directions (thrust direction) of the axis of the rotating shaft of the turntable 8 and, at its lower end portion, mechanically engaged with a weight-detecting means 15. A temperature compensation means 16 is disposed in the vicinity of the weight-detecting means 15. The weight-detecting means 15 and the temperature compensation means 16 are electrically coupled through a detection circuit 17 to the control section 6. The weight-detecting means may be of any one of various types weight sensors or detecting-devices such as strain gage, electrical capacitance type pressure sensor and displacement sensor.

Figure 3A:
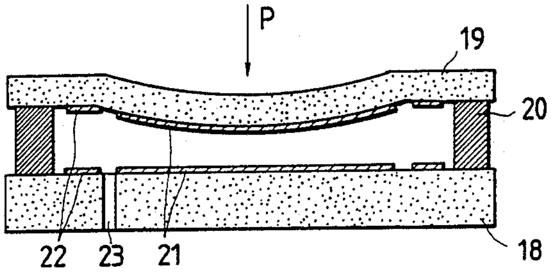
FIG. 3A is a cross-sectional illustration of an electrical capacitance type weight sensor used in the automatic heating appliance of the embodiment.
Figure 3B:
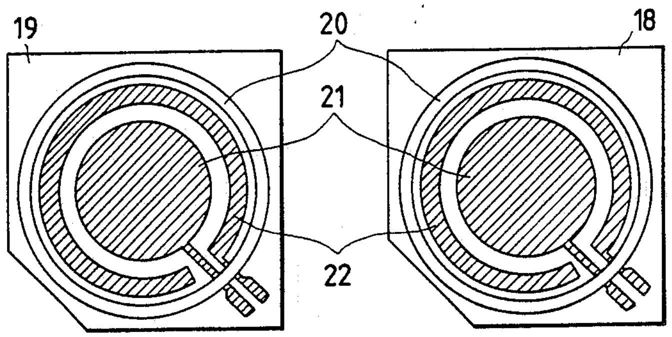
FIG. 3B are development illustrations of the FIG. 3A weight sensor.

FIGS. 3A and 3B show an example of electrical capacitance type weight sensors where the weight detecting means 15 and the temperature compensation means 16 are constructed as one-piece device. In FIGS. 3A and 3B, the electrical capacitance type weight sensor 15 comprises a base plate 18 and a diaphragm which are constructed of an insulating flat plate made of an alumina, for example, and which are vertically spaced by a predetermined distance d from each other by means of a circular, or cylindrical, sealing member 20 so as to form therein a cylindrical space. The base plate 18 and the diaphragm 19 respectively have detection electrodes 21 which act as the weight-detection means 15 and which are disposed on substantial center portions of the inner surfaces thereof so as to face each other in the cylindrical space. Around each of the detection electrodes 21 is provided a reference electrode 22 which acts as the temperature compensation means 16.

In response to application of a load P onto the diaphragm 19, the diaphragm 19 is bent as illustrated in FIG. 3A whereby the electrical capacitance Cw developed between the detection electrodes 21 varies. In this instance, the reference electrode 22 provided around the detection electrode 21 of the diaphragm 19 is not virtually bent thereby because it is positioned near the sealing member 20 so that the electrical capacitance Cr developed between the reference electrodes 22 is substantially kept as it is.

Furthermore, the reference electrodes 22 are made of the same material as the detection electrodes 21 and are respectively disposed near the detection electrodes 21, and therefore the temperature characteristics of both the detection electrode 21 and the reference electrode 22 are substantially equal to each other. While the electrical capacitance due to the detection electrodes 21 depends upon both the the load variation and the temperature, the electrical capacitance due to the reference electrodes 22 substantially depends on only the temperature variation. Accordingly, by subtracting the variation of the electrical capacitance due to the reference electrodes 22 from the variation of the electrical capacitance due to the detection electrodes 21, it is possible to attain the variation of the electrical capacitance corresponding to only the weight (load) variation of the object 9 placed on the turntable 8. In FIG. 3A, numeral 23 is a through-hole formed in the base plate 18, whereby the air within the cylindrical space are communicated with the outside air so as to prevent expansion and contraction of the air therewithin due to variation of the atmosphere temperature which adversely affects the temperature characteristic of the weight-detecting means.

Figure 4A:
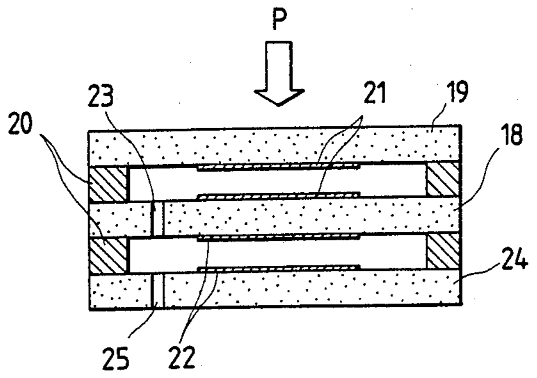
FIGS. 4A to 4C are illustrations of other weight sensors useful in this embodiment.
Figure 4B:
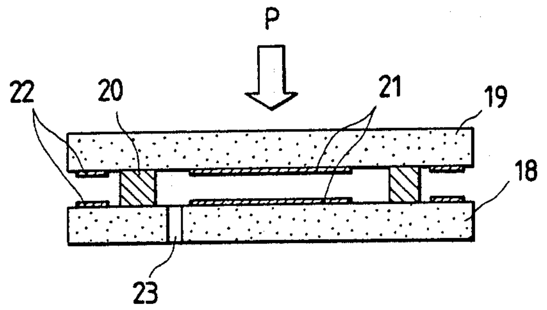
Figure 4C:
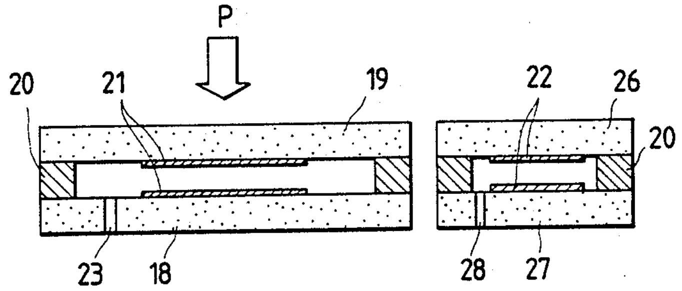

FIGS. 4A through 4C show other weight sensors, FIGS. 4A and 4B illustrating weight sensors integrally including both the weight-detecting means 15 and the temperature compensation means 16 and FIG. 4C illustrating a weight sensor in which the weight-detecting means 15 and the temperature compensation means are separated from each other but the temperature compensation means 16 is positioned near the weight-detecting means 15.

In FIG. 4A, the weight sensor is of the double layer type that a diaphragm 19 and two base plates 18 and 24 are arranged vertically so as to form two spaces therebetween by means of two sealing members 20. Detection electrodes 21 are respectively placed on the lower surface of the diaphragm 19 and the upper surface of the base plate 18 so as to be disposed in the upper space between the diaphragm 19 and the base plate 18 to be in opposed relation to each other, whereas reference electrodes 22 are disposed in the lower space between the two base plates 18 and 24. Numeral 25 is a through-hole for establishing the communication between the air within the lower space and the outside air. In FIG. 4B, detection electrodes 21 are disposed inside a sealing member 20, while reference electrodes 22 are arranged outside the sealing member 20. Similarly, the detection electrodes 21 and the reference electrodes 22 are respectively placed on the lower surface of the diaphragm 19 and the upper surface of the base plate 18 so as to face each other. In FIG. 4C, the weight sensor is of the two-piece structure type that reference electrodes 22 are disposed between newly provided base plates 26 and 28, made of the same material as the base plate 18, so that the weight-detecting means 15 and the temperature-compensation means 16 are formed independently, but near from each other. Numeral 28 represents a through-hole for establishing the communication between the air within the space between the base plates 26, 27 and the outside air. Here, in the case of FIG. 4C, it is also appropriate to use, instead of the reference electrodes 22, a capacitor such as ceramic capacitor with the same temperature characteristic and same capacitance as the detection electrodes 21.

In the embodiment, it is also possible to use weight sensing devices such as piezoelectric device and inductance device other than the above-described electrical capacitance type device. In this instance, a device, being the same as the weight-detection means, is disposed in the vicinity of the weight-detecting means and at a position that does not impose virtually any loading on the device regardless of placing the object to be heated on the turntable 8.

Figure 5:
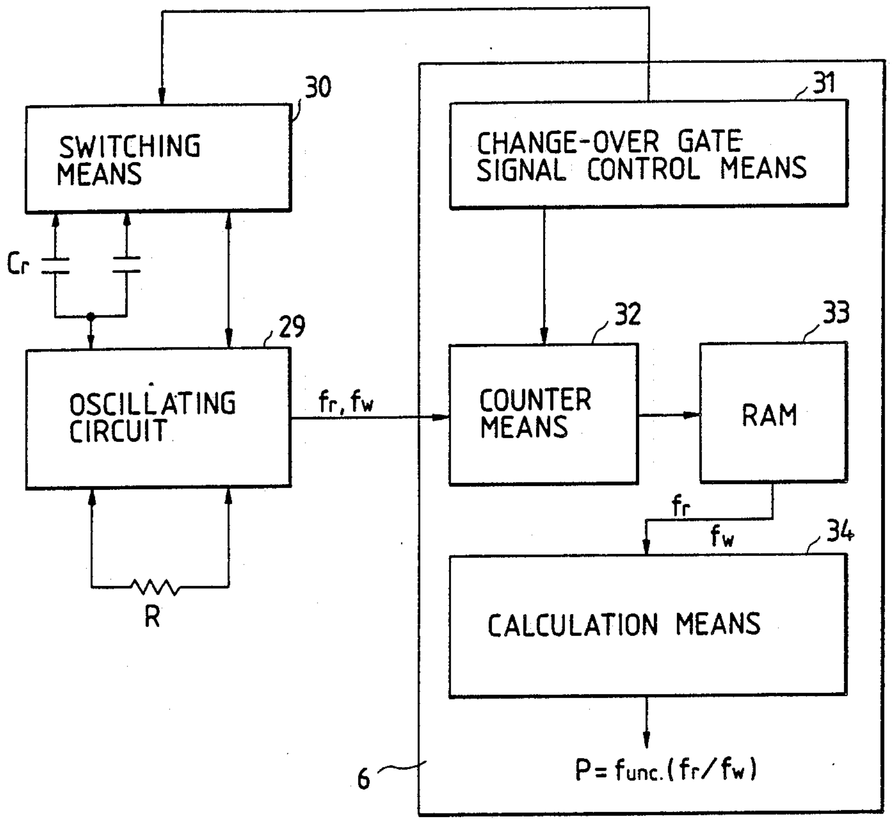
FIG. 5 is a block diagram showing a control circuit for the weight sensor.
Figure 6A:
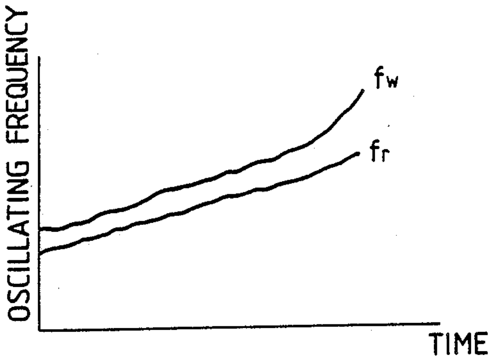
FIG. 6A is a graphic diagram showing variation of the output frequency of a detection circuit with the passage of time.

FIG. 5 is a control block diagram showing the control relation between the detection circuit 17 and the control section 6. In FIG. 5, here, as the detection circuit 17 is used a CR oscillating circuit 29 which is provided with a resistor R and responsive to the reference electrical capacitance Cr developed due to the reference electrodes 22 and further the detection electrical capacitance Cw developed due to the detection electrodes 21. Illustrated at numeral 30 is a switching means which is controlled by a change-over gate signal control means 31 of the control section 6 so that the reference electrical capacitance Cr and the detection electrical capacitance Cw are selectively coupled to the oscillating circuit 29 which in turn outputs a signal with an oscillating frequency fr corresponding to the reference electrical capacitance Cr and a signal with an oscillating frequency fw corresponding to the detection electrical capacitance Cw to a counter means 32 of the control section 6. The outputs (fr, fw) of the counter means 32 are temporarily stored in a random access memory (RAM) 33, before directing to a calculation means 34 to calculate a frequency ratio r of the output frequencies fr and fw, for example. FIG. 6A shows variations of the output frequencies fr and fw of the oscillating circuit 29 with respect to time during heating operation.

The detection oscillating frequency fw due to the detection capacitance Cw is affected by both the weight variation and temperature variation, whereas the reference oscillating frequency fr due to the reference capacitance Cr is affected by only the temperature variation. Thus, in accordance with the relation between the frequencies fw and fr, it is possible to obtain only a value corresponding to only the weight variation through subtraction or division in the calculation means 34 of the control section 6. Here, a description of the division process will be given hereinbelow. That is, the frequency ratio r of the oscillating frequencies fw and fr is initially obtained as follows:

$$r = fr/fw \tag{1}$$

and $$r = \frac{fr}{fw} = \frac{K/RCr}{K/RCw} = \frac{Cw}{Cr} \tag{2}$$

here, since an single oscillating circuit 29 is used for both the frequencies fr and fw, the circuit constants K having the temperature characteristics are the same with respect to fr and fw and the resistances R are similar to each other, and therefore, as obvious from the aforementioned equation (2), the frequency ratio r results in obtaining the ratio of the detection capacitance Cw and the reference capacitance Cr.

Figure 6B:
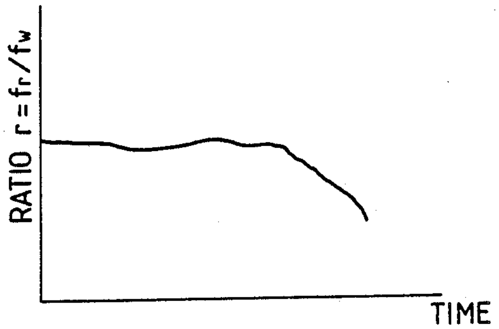
FIG. 6B is a graphic illustration of the ratio of the frequencies from the detection circuit.

Since the temperature characteristics of the reference electrodes and the detection electrodes are substantially equal to each other, the weight calculated on the basis of the obtained frequency ratio r does not include the affects of variation of the temperature characteristic. FIG. 6B shows variation of the calculated frequency ratio r with respect time.

Figure 7:
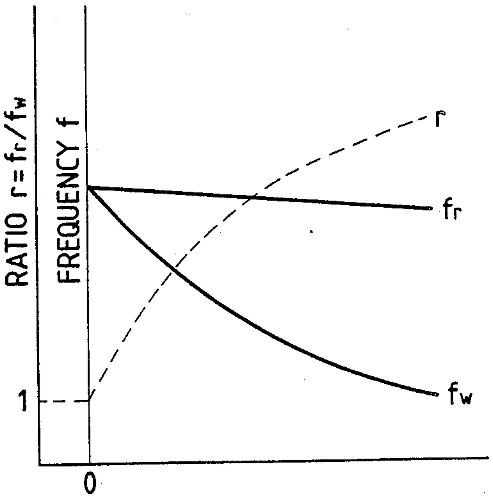
FIG. 7 is a graphic diagram showing the relation between the frequency ratio and the weight.

FIG. 7 is a graphic illustration showing the relation between the frequency, frequency ratio and the weight. Thus, the weight w can be obtained in accordance with, for example, the following equation:

$$w=ar^2+br+c \quad (3)$$

where a, b, and c are constants.

Figure 8:
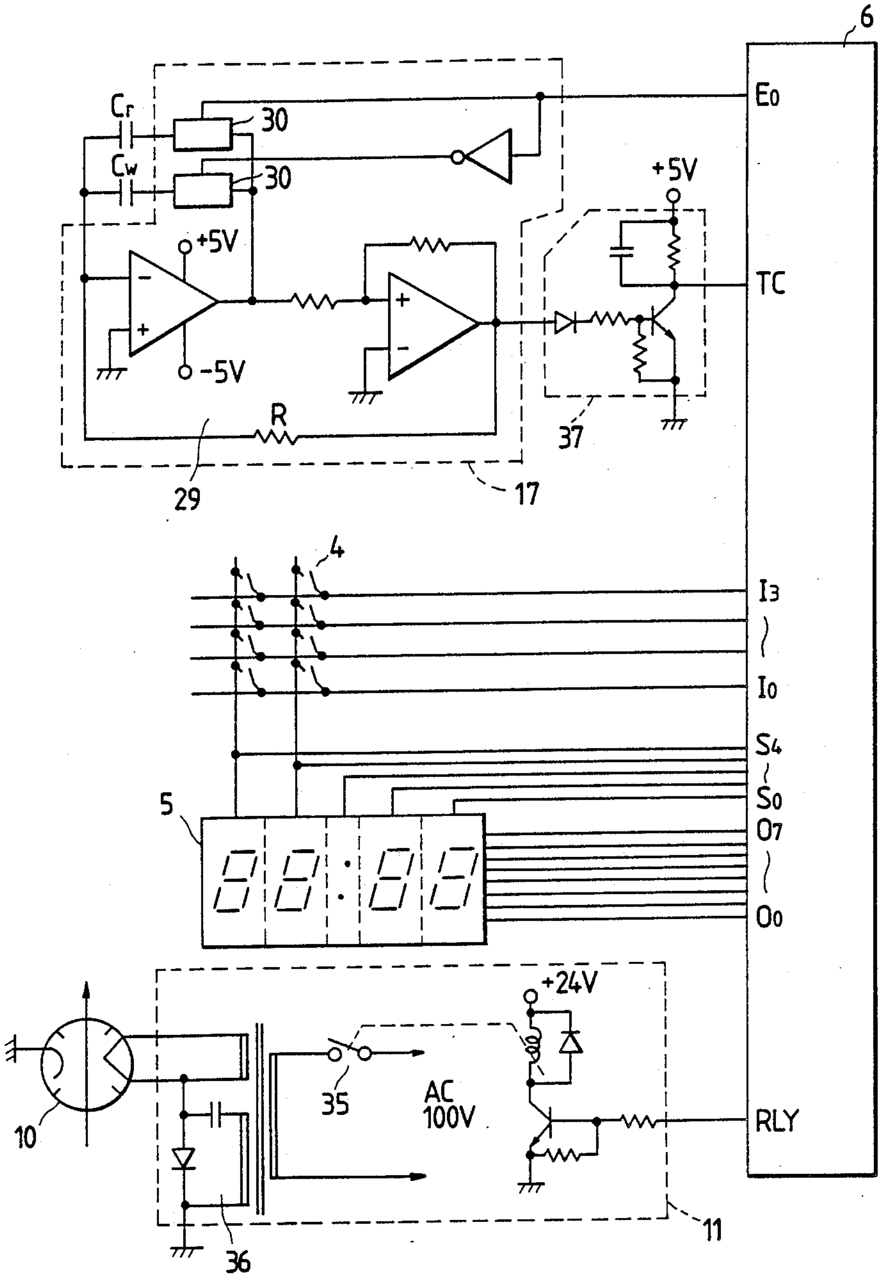
FIG. 8 is a circuit diagram showing an electric circuit employed in the automatic heating appliance of this embodiment.

FIG. 8 illustrates the entire circuit arrangement of an automatic heating appliance of this embodiment. In FIG. 8, the control section 6 comprises a well known microcomputer including a central processing unit (CPU) and is coupled to the keyboard 4 which has a key matrix which is in turn coupled to input terminals $I_0$ to $I_3$. The indication means 5 comprising a fluorescence indicating tube effects dynamic lighting in response to digit signals S0 to S4 and indication data signal 00 to 07. The driver 11 comprises a relay 35 and a voltage-increasing section 36 and supplies an electric power to the magnetron 10 in accordance with a RLY signal. The detection circuit 17 includes a single oscillating circuit 29 (operational amplifier TL082, for example) comprising a combination of a sawtooth oscillator and a waveform shaping circuit and further includes the switching means 30. The switching means 30 alternately switches the detection capacitance Cw and the reference capacitance Cr which are in turn inputted into an input terminal TC of a counter (counter means 32) encased in the microcomputer 6 (for example, MB88515). The switching operation is effected in accordance with a switching gate signal Eo. Although the switching means comprises an analog switch ($\mu$ PC4066, for example), it is also appropriate to use a semiconductor switching means or a relay circuit. Illustrated at numeral 37 is a level shift circuit for voltage transformation and waveform shaping, which is incorporated thereinto, if required.

Figure 9:
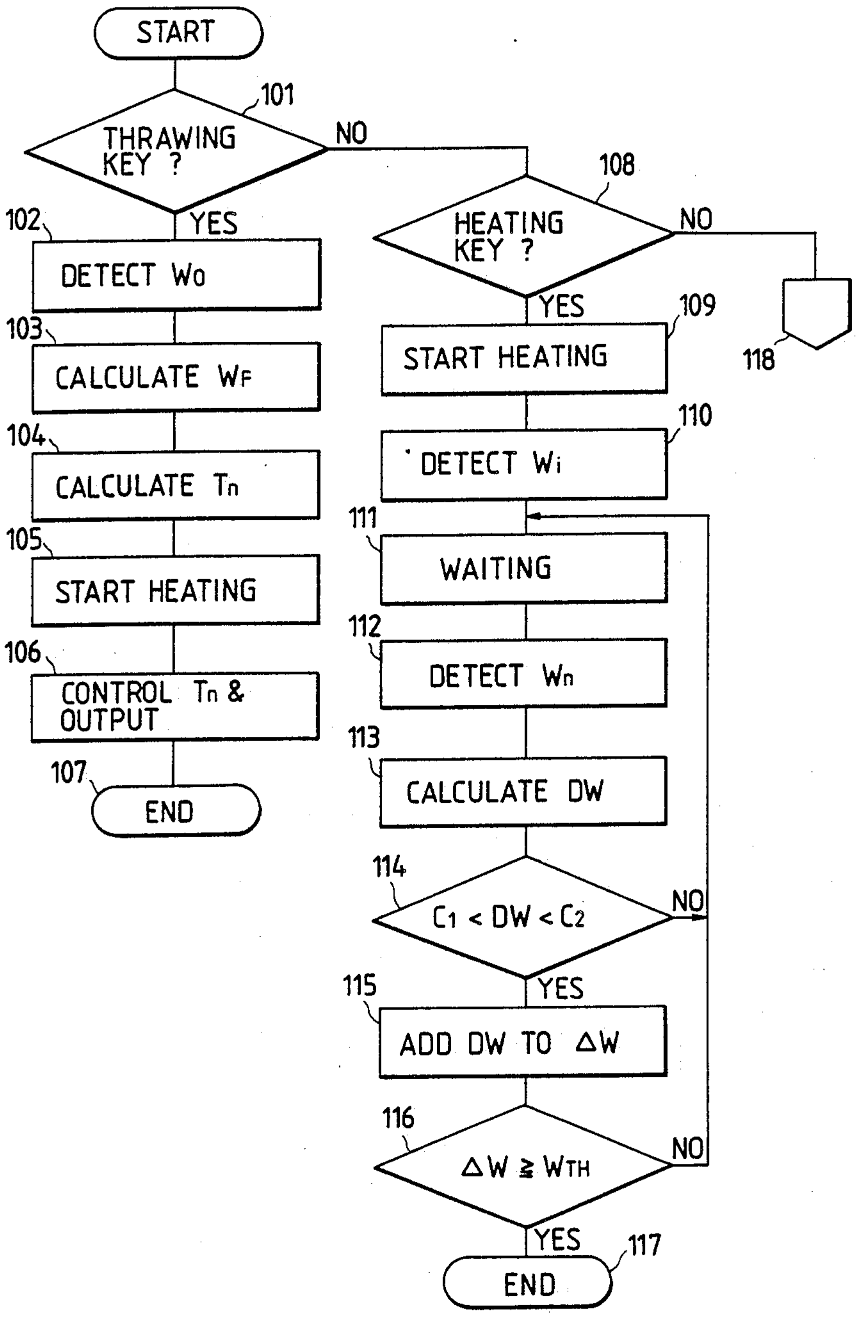
FIG. 9 is a flow chart showing one example of the control program to be used in the automatic heating appliance of the embodiment.

FIG. 9 is a flow chart showing operation to be executed in the microcomputer 6 in accordance with a predetermined program prestored in a memory thereof. The microcomputer starts with a step 101 to check the contents of the operated instruction key, for example, whether the thawing key is operated by a user. If so, control goes to a step 102 in order to detect the total weight Wo of an object to be heated prior to heating. In the thawing, generally used is an attachment, made of an appropriate resin, which is arranged so as to drop down water or gravy from a frozen food onto the turntable 8 to allow the food to be separated from the water or gravy. Therefore, in a subsequent step 103, the net weight $W_F$ of the object to be heated is calculated by subtracting the weight $W_N$ of the attachment from the total weight Wo thereof. That is, $$W_F=Wo-W_N \quad (4)$$

Thereafter, a step 104 is executed in order to calculate a thawing time $T_D$ as a function of the obtained net weight $W_F$. Here, it is preferable that for the thawing the heating time is determined in stages with the heating power being gradually decreased. Thus, the thawing time $T_D$ may be set as follows.

$$T_d=T1+T2+T3+T4 \quad (5)$$

where T1 represents time for a high-power heating stage, T2 designates time for a heating interruption stage, T3 denotes time for a middle-power thrawing stage, and T4 is time for a low-power finishing stage.

For example, the time Tn for each of the stages can be expressed as follows.

$$Tn=An\ W_f=Bn \quad (6)$$

where An and Bn are constants (n=1 to 4) determined in accordance with the respective stages.

In response to the determination of the heating times, control advances to a step 105 to start the heating, followed by a step 106 to control the heating time and the high-frequency output to the heating means 10. After elapse of the total time $T_D$, the heating is automatically terminated in a step 107.

Figure 10A:
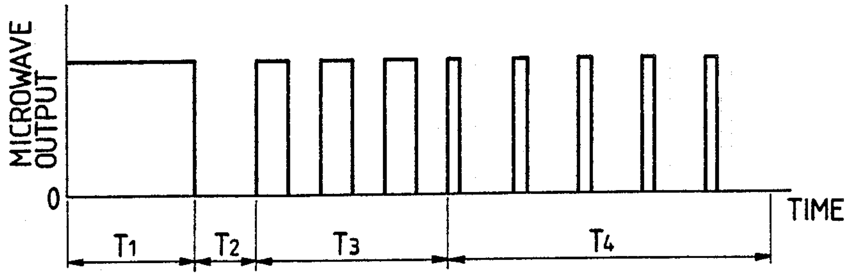
FIG. 10A shows the heating control executed in response to the thrawing instruction key.

FIG. 10A is a time chart for an understanding of the power supply to the heating means 10.

On the other hand, if the answer of the step is negative, control goes to a step 108 in order to check whether the heating instruction key is operated. If the answer of the step 108 is "NO", other process will be effected. If so, control goes to a step 109 to start the heating operation. Here, the heating operation should be required to be executed so as not to receive influence of vibration and disturbance with respect to the weight sensor. Therefore, after the start of the heating, a step 110 is executed to detect the initial weight Wi of the object to be heated and a step 111 is then executed to have a wait for a predetermined time period. Thereafter, a step 112 is performed to detect the weight Wn of the heated object, then followed by a step 113 to calculate the difference DW between the successively detected weights as follows.

$$DW=Wn-Wn-1 \quad (7)$$

In the initial state, the weight of the heated object is not virtually varied and therefore the value of DW corresponds to only the output variation due to the temperature characteristics of the circuits and elements. As the heating proceeds, vapors and so on are started to be generated from the heated object so as to decrease the weight of the heated object. Thus, the completion timing of th heating can be controlled in accordance with the variation of the weight of the heated object.

Based on the weight detected at a predetermined time interval, the the difference DW can be considered to be the time change rate of the weight variation, i.e., the time differential value. Accordingly, it is possible to check whether the obtained difference value DW results from the normal weight decrease of the heated object by comparing the difference value DW with predetermined values. Thus, in a step 114, the difference value DW is compared with two predetermined values (constants) C1 and C2 as follows.

$$C1<DW<C2 \quad (8)$$

That is, if the difference value DW is greater than the value C1, the difference value DW includes the decrease in the weight of the heated object in addition to the value due to the temperature characteristics of the devices. Further, if smaller than the value C2, the difference value DW is the normal weight decrease value of the heated object without including the value due to the noises such as vibration from the external.

If the condition shown in the equation (8) is satisfied, control advances to a step 115 to add the difference value DW so that the difference weight DW is integrated so as to obtain the weight variation Δ W as follows.

$$\Delta W = \Sigma DW \quad (9)$$

In the step 114, if the difference value Dw is smaller than the value C1, the difference value DW is considered to be a value due to the output variation caused by the temperature characteristics of the devices and others and therefore the difference value DW is not used in this process. Similarly, If the difference value DW is greater than the value C2, the difference value Dw is considered to be based on noises and so on and is not used as data in this process.

Figure 10B:
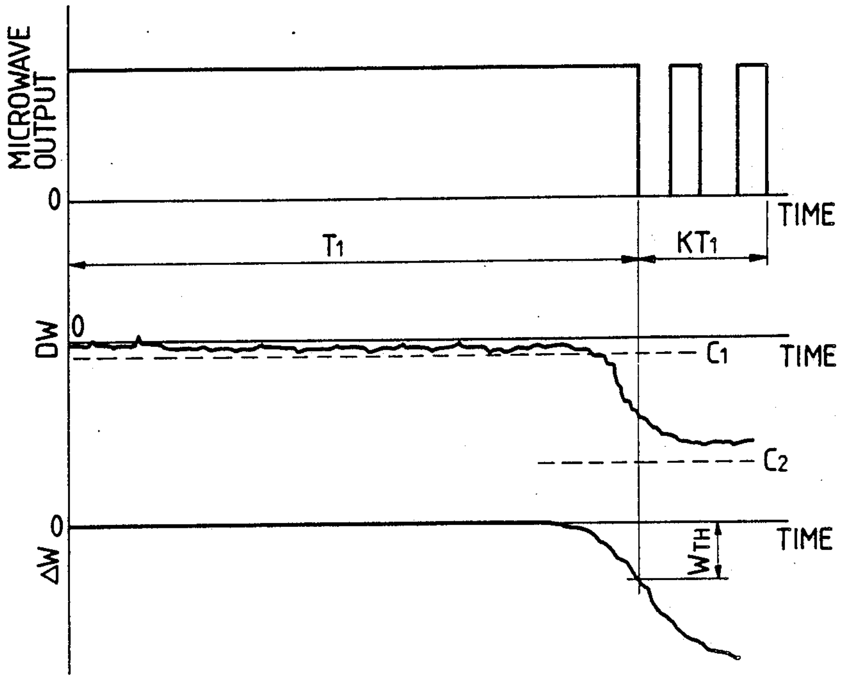
FIG. 10B illustrates the heating control executed in response to the heating instruction key.

With above-mentioned process, the difference value integration weight Δ W accurately corresponds to the weight variation of the heated object. The integration value Δ W is compared with a threshold value $W_{TH}$ in a step 116 so as to check whether the weight variation reaches a predetermined value. If exceeding the threshold value $W_{TH}$, the heating of the object advances to a predetermined level and hence the power supply to the heating means 10 is changed or terminated in a step 117. FIG. 10B is a time chart for understanding the above-mentioned heating operation due to the operation of the heating instruction key. The time T1 reaching the threshold value $W_{TH}$ is counted, and then the heating is continuously performed with a low output for a predetermined time period KT1 where K is a constant, for example.

Figure 11:
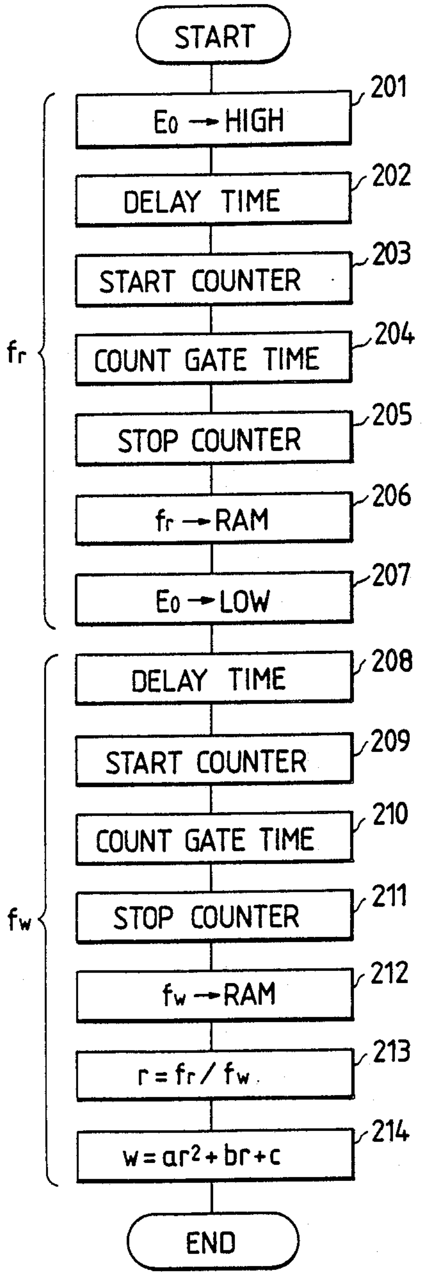
FIG. 11 is a flow chart showing the measurement of the weight of an object to be heated.

FIG. 11 is a flow chart showing a control program for the weight sensor. This program starts with a step 201 to set the gate signal Eo to the high-level state, then followed by a step 202 to provide a delay time and further followed by a step 203 to start the counter coupled to the TC terminal, thereby starting the detection of the reference frequency fr. Control further advances to a step 204 to count the gate time (for example, 1 second). After elapse of the time, the counter is stopped in a step 205 and the result fr is stored in the RAM 33 in a step 206. Thereafter, control goes to a step 207 to change the gate signal Eo to the low-level state, then followed by steps 208 to 212 to similarly perform the measurement of the detection frequency fw.

Thereafter, the frequencies fr and fw stored in the RAM 33 are processed so as to obtain the frequency ratio r in a step 213 and the weight w is calculated on the basis of the obtained frequency ratio r.

Figure 12:
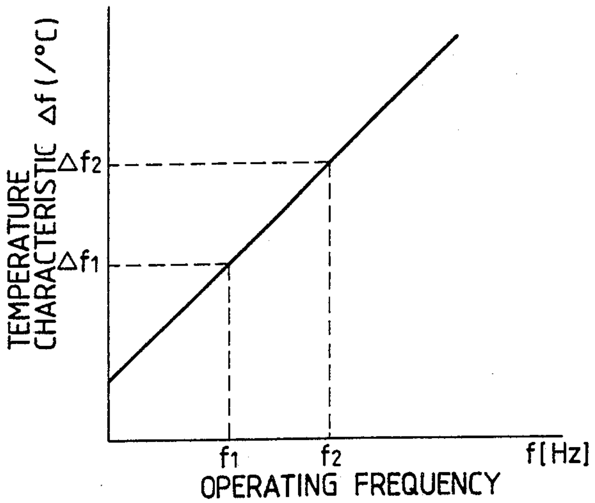
FIG. 12 is a graphic diagram showing the relation between the operating frequency and the temperature characteristic.

Here, the reason that the drift of the temperature characteristic is not completely eliminated by only the frequency ratio r will be described below with reference to FIG. 12 showing the measurement results of the temperature characteristic of the operating frequency f of an oscillating circuit, where the operating frequency f indicated on the horizontal axis is varied by variation of the capacitance or resistance and the temperature characteristic Δ f is obtained in accordance with the following equation.

$$\Delta f = (f_{20} - f\alpha)/\{f_{20} \times (\alpha - 20)\} \quad (10)$$

where $f_{20}$ represent a frequency under the condition of the temperature of 20° C. and f α designates a frequency under the condition of the temperature of α°C.

That is, FIG. 12 shows that irrespective of keeping small the temperature characteristic of the sensor, the temperature characteristic of the oscillating circuit is kept as it is and developed in accordance with the operating frequency so that the temperature characteristic increases with the heightening frequency. Generally, regardless of the type of the oscillating circuit, the temperature characteristic depends upon the operating frequency. In the case of using an oscillating circuit as means for detecting the capacitance of the sensor, when the detection frequency and the reference frequency is equal to each other, that is, when the detection capacitance and the reference capacitance are equal to each other, the temperature characteristic can be completely eliminated. However, in response to occurrence of the difference between the frequencies, the temperature charaacteristic due to the circuit is developed accordingly.

Figure 13:
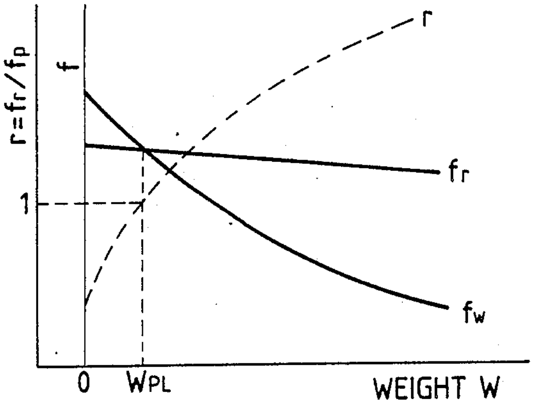
FIG. 13 is a graphic diagram showing the relation between the weight of the object and frequencies, frequency ratio.

Thus, in this embodiment, the capacitances of the detection electrodes and the reference electrodes are selectively determined with respect to the weight of the turntable 8. FIG. 13 shows the relation between the capacitances of the detection electrodes and reference electrodes (reference and detection frequencies) and the weight of the object to be measured (heated) (load applied to the sensor), where the horizontal axis represents the weight w of the object to be measured and the vertical axis represents the output frequency of the detection means and the frequency ratio r. In FIG. 13, the point of $W = W_{PL}$ represents the weight of only the turntable. Here, in the case of $W = W_{PL}$, when the reference capacitance Cr and the detection capacitance Cw are arranged to be equal to each other, the lines indicating the frequencies fr and fw are crossed at the point of $W = W_{PL}$. Accordingly, at the point of $W = W_{PL}$, the frequency ratio r becomes 1. As described above with reference to FIG. 12, when the operating frequencies are equal to each other, the temperature characteristic due to the circuit can be completely eliminated. That is, the temperature characteristic at the point $W_{PL}$ resulting in r=1 becomes zero. Thus, if the ratio e of the frequencies fr and fw is obtained and the detection capacitance Cw and the reference capacitance Cr are arranged to be equal to each other at the point of $W = W_{PL}$, it is possible to remove the temperature characteristic of the sensor and the temperature characteristic of the circuit. This means that as the weight of the object to be measured is smaller, the temperature characteristic can be kept smaller, thereby obtaining an excellent performance.

Figure 14:
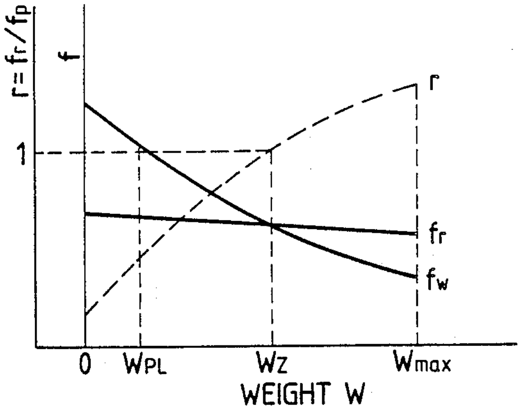
FIG. 14 is a graphic illustration of another relation between the weight and frequencies, frequency ratio.

FIG. 14 is a graphic illustration of the relation between the capacitances of the detection electrodes and reference electrodes and the weight of the object to be measured in another example. In this case, the reference capacitance Cr and the detection capacitance Cw are arranged to be equal to each other when W=Wz, where Wz is substantially a middle value between the turntable weight $W_{PL}$ and the maximum weight Wmax. Accordingly, the temperature drift becomes zero when W=Wz. Therefore, the temperature drift becomes minimum over all the range of the detection weight.

It should be understood that the foregoing relates to only preferred embodiments of the invention, and that it is intended to cover all changes and modifications of the embodiments of the invention herein used for the purposes of the disclosure, which do not constitute departures from the spirit and scope of the invention.

What is claimed is:

1. An automatic heating device, comprising:

a heating chamber;

table means, located within said heating chamber, for holding an object during heating of said object;

heating means for heating said object;

weight detection means for detecting the weight of said object while being held by said table means, comprising:

a cylindrical sealing member;

two flat plates enclosing the top and bottom of said sealing member;

two detection electrodes, one each located essentially near a center portion of said flat plates so as to define a first gap therebetween;

two reference electrodes, one each located near the perimeter of said flat plates near said cylindrical sealing member so as to define a second gap therebetween;

said electrodes being configured so as to allow the size of said first gap to vary in response to the weight of said object while the size of said second gap remains essentially constant;

an oscillating circuit for sensing capacitances due to said detection electrodes and said reference electrodes and providing a pulse signal output having a frequency corresponding to said capacitances;

switching means for selectively switching said oscillating circuit between said reference electrodes and said detection electrodes;

counter means for counting pulses of said pulse signal output;

calculation means for calculating a ratio of the frequencies corresponding to said capacitances due to said detection electrodes and said reference electrodes, respectively, said calculating means calculating the weight of said object on the basis of said ratio; and control means for controlling said heating means in response to said calculated weight.

2. An automatic heating appliance as claimed in claim 1, wherein said detection electrodes and said reference electrodes are arranged such that a load applied to said weight detection means so that the electric capacitance due to said detection electrodes and the electric capacitance due to said reference electrodes are substantially equal to each other is a value between the weight of only said table means and a maximum weight to be applied to said weight detection means.

3. An automatic heating appliance as claimed in claim 1, wherein said detection electrodes and said reference electrodes are arranged such that a load applied to said weight detection means so that the electric capacitance due to said detection electrodes and the electric capacitance due to said reference electrodes are substantially equal to each other is the same as the weight of only said table means.

4. An automatic heating appliance as claimed in claim 1, wherein the load applied to said weight detection means so that the electric capacitance due to said detection electrodes and the electric capacitance due to said reference electrodes are substantially equal to each other is ½ of the difference between the weight of only said table means and a maximum weight to be applied to said weight detection means.

* * * * *